US005572780A

United States Patent [19]

Haan

[11] Patent Number: 5,572,780

[45] Date of Patent: Nov. 12, 1996

[54] PIN PULLING ASSEMBLY

[76] Inventor: Louis Haan, 3747 W. Rte. 64, Lot 17, Mt. Morris, Ill. 61054

[21] Appl. No.: 346,692

[22] Filed: Nov. 30, 1994

Related U.S. Application Data

[62] Division of Ser. No. 224,789, Apr. 8, 1994, Pat. No. 5,426, 839.

[51] Int. Cl.$^6$ .......... B23P 19/04

[52] U.S. Cl. .......... 29/267; 254/30; 254/94

[58] Field of Search .......... 254/131, 25, 120, 254/94, 18, 30, 15, 17; 269/236; 29/267, 239

[56] References Cited

U.S. PATENT DOCUMENTS

| | | | |
|---|---|---|---|
| 1,566,377 | 12/1925 | Currente | 269/236 |
| 1,643,838 | 9/1927 | Corbin | 269/236 |
| 2,157,345 | 5/1939 | Nelson | 269/236 |
| 3,761,058 | 9/1973 | Stone et al. | 254/94 |
| 3,785,618 | 7/1974 | Medwick et al. | 254/94 |
| 4,183,503 | 1/1980 | Ward | 254/131 |
| 5,176,363 | 1/1993 | Bowlin | 254/131 |

*Primary Examiner*—Robert C. Watson
*Attorney, Agent, or Firm*—Kajane McManus

[57] ABSTRACT

The pin pulling assembly includes an active member which is engageable to a pin, the active member comprising a handle having an increasing radius spiral configuration, the radius increasing from a center pin engaging vertex stud. Further, the assembly includes a plurality of passive stud engaging collars for use with the active member when the pin has a flat head. By rotating the active member, the increasing radius produces a simple extraction of the pin.

4 Claims, 2 Drawing Sheets

FIG. 1
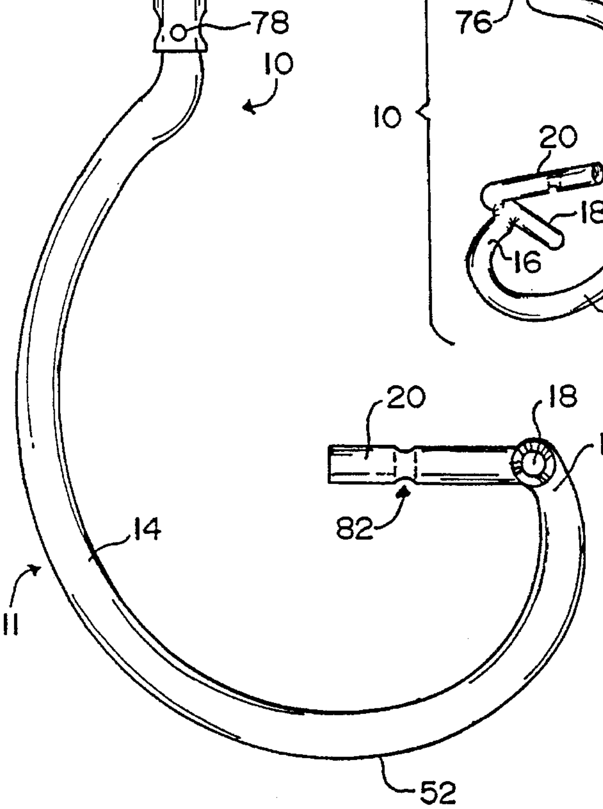
FIG. 2
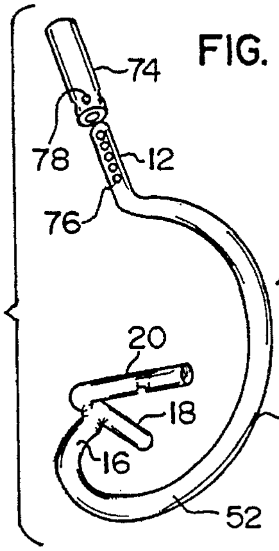
FIG. 3
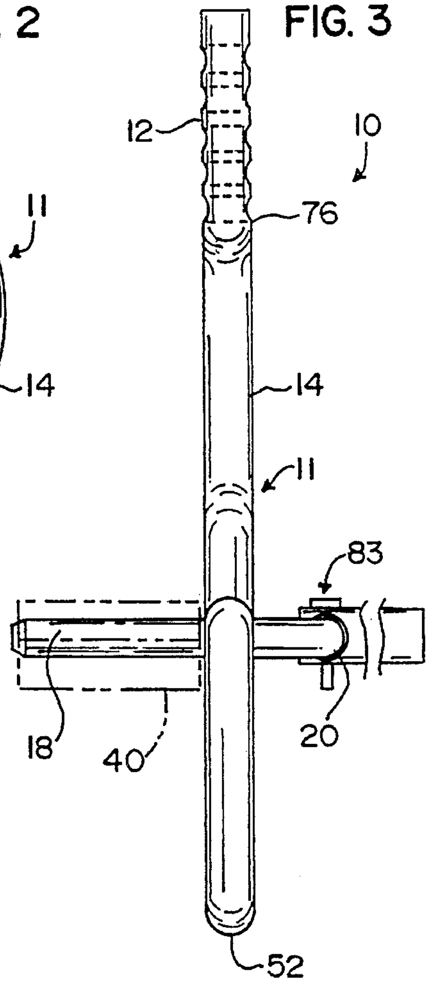
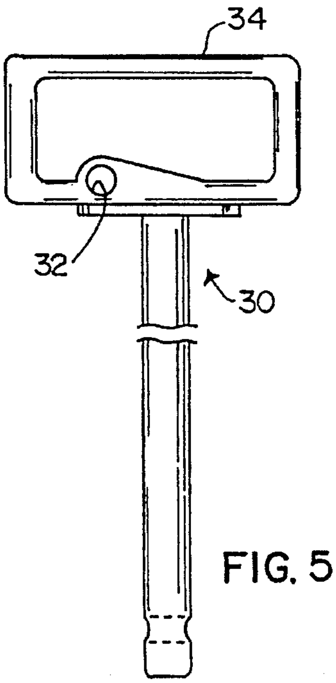
FIG. 5
FIG. 4
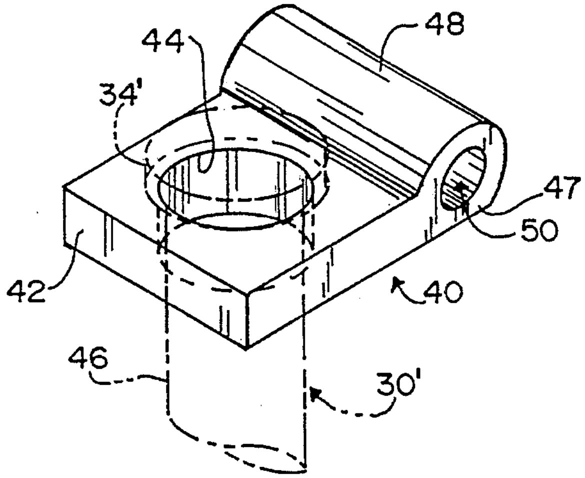

PIN PULLING ASSEMBLY

CROSS REFERENCE TO RELATED APPLICATION

This application is a division of U.S. application Ser. No. 224,789 filed on Apr. 8, 1994 now U.S. Pat. No. 5,426,839 and entitled Pin Pulling Assembly.

BACKGROUND OF THE INVENTION

1. Field of the Invention

The present invention relates to an assembly for use in removing a pin, such as a hitch pin, from its engagement to structures being held together thereby, without need of substantial physical exertion. More particularly, the assembly includes a handle which engages a pin and, through the application of leverage thereby, removes the pin easily, the handle being in the form of a spiral having an increasing radius from a center pin engaging end or vertex. An added benefit is that the assembly is also adapted for use in holding a tongue of a structure such as a trailer at an elevated position for engagement purposes.

2. Description of the Prior Art

Heretofore, the pulling of a pin, such as a hitch pin, from its engagement between two interdependent structures, has been a tedious and arduous task, requiring a high degree of physical strength, at times.

Attempts have been made in the past to decrease the physical strength required to remove the pin, such as when it is jammed in its slot or socket.

For example, U.S. Pat. No. 3,046,037 discloses a semiautomatic coupler while U.S. Pat. No. 2,535,468 proposes a pin in combination with a lifting hook for use in disengaging the pin.

Each of the above described removal devices requires physical exertion to remove the pin when the openings the pin passes through are out of perfect alignment, cocking the pin therebetween.

As will be described in greater detail hereinafter, the pin pulling assembly of the present invention significantly decreases the amount of physical force required to remove a pin by providing a structure which acts on a leverage principle.

Further, the task of connecting the hitch pieces together is no easy task, inasmuch as proper alignment is necessary for the interconnection to take place. The assembly herein proposed can also be used to hold a tongue portion at a proper elevation for such engagement as will be described in greater detail hereinafter.

SUMMARY OF THE INVENTION

According to the present invention there is provided a pin pulling assembly comprising at least one active member having a planar increasing radius spiral configuration and having open pin head engaging means at a center end thereof. The assembly further includes a passive member for use in engaging a flat head pin to the open pin head engaging means.

Still further according to the invention there is provided an assembly for use in supporting one of two elements to be joined together a predetermined distance above the ground, the assembly comprising a member having a planar increasing in radius spiral configuration having a handle at each end thereof and having a sleeve engageable to either handle, the sleeve creating a support platform for one of the elements.

BRIEF DESCRIPTION OF THE DRAWINGS

FIG. 1 is a side view of an active element of a pin pulling assembly made in accordance with the teachings of the present invention and shows a sleeve engaged over a primary handle thereof.

FIG. 2 is a small perspective view of the active element of FIG. 1 showing the sleeve disengaged.

FIG. 3 is an end view of the pin pulling assembly and shows a pin engaging collar of the assembly in phantom together with the sleeve shown engaged to create a secondary handle for the assembly.

FIG. 4 is a perspective view of a pin collar showing one embodiment of a pin engaged therewith in phantom.

FIG. 5 is a side view of one embodiment of a pin which could be used with the active member of the assembly.

DESCRIPTION OF THE PREFERRED EMBODIMENT

Figure 6:
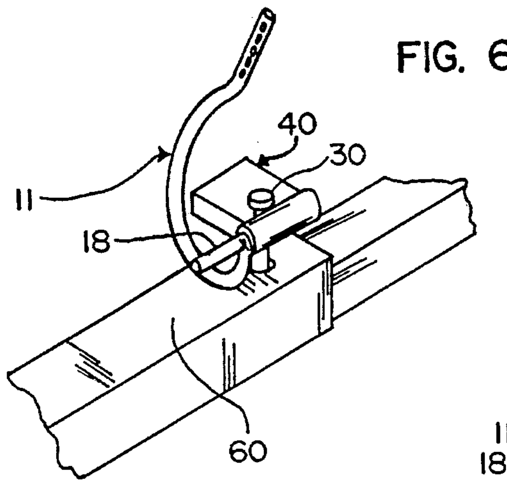
FIG. 6 is a perspective view of the pin pulling assembly and shows one embodiment in use in removing a pin.

Referring to the drawings in greater detail, there is illustrated in the Figures a pin pulling assembly made in accordance with the teachings of the present invention and generally identified by the reference numeral 10.

As illustrated, the assembly 10 includes an active member 11 having a primary graspable handle 12 from which an arcuate member 14 extends. At a distal end 16 of the member 14 is a stud 18 and a secondary graspable handle 20 may be incorporated as well, if desired. The stud 18 and secondary handle 20 are coplanar, with both lying in planes perpendicular to the handle 12 as seen in FIGS. 1 and 3, with the stud 18 extending laterally from and to one side of the arcuate member 14 and the secondary graspable handle 20 extending in the opposite lateral direction from the arcuate member 14.

Figure 7:
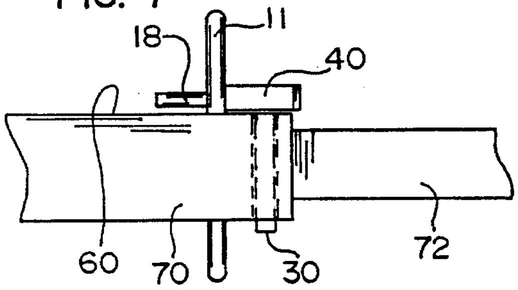
FIG. 7 is a side view of the structures shown in FIG. 6 and shows the assembly in a just engaged position thereof.
Figure 8:
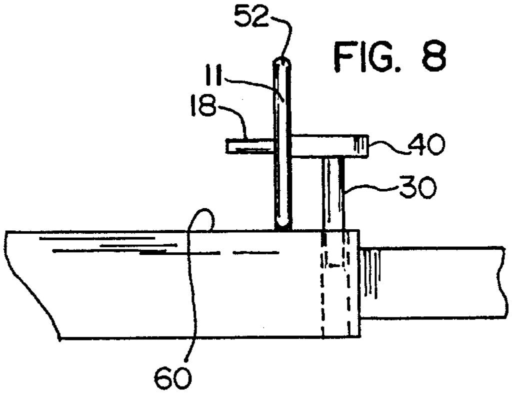
FIG. 8 is a side view similar to FIG. 7 and shows the assembly rotated to a position causing partial disengagement of the pin.
Figure 9:
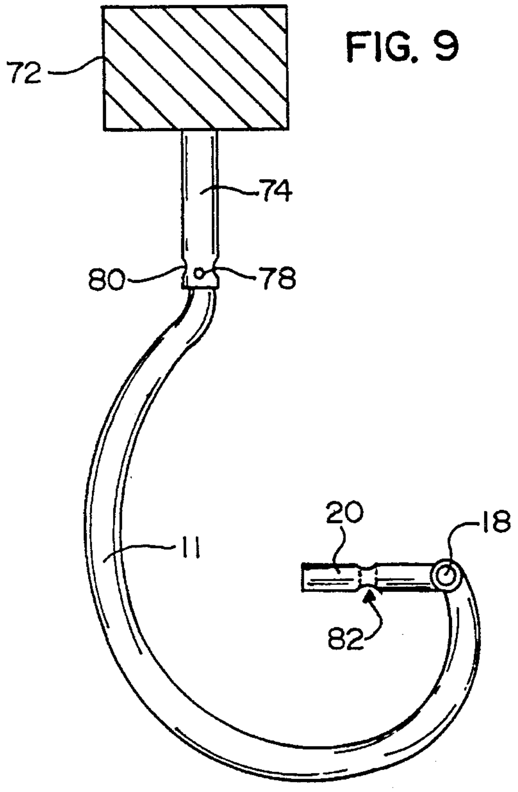
FIG. 9 shows the assembly and its sleeve in use in elevating a trailer tongue above the ground.

If the secondary graspable handle 20 is not desired, the stud 18 can be extended past the arcuate member 14 in both directions, making the member 11 accommodating to a pin 30 which may be more easily engaged from the right or the left of the arcuate member 14, as shown in FIGS. 6–8.

Obviously, if the secondary graspable handle 20 is provided, the puller 10 need just be turned around to accommodate a pin 30 to either side thereof.

The member 11 may be used alone when a pin 30 is provided having a configuration similar to that shown in FIG. 5, with the pin 30 having a bore 32 in a handle portion 34 of the pin 30.

Since pins 30, such as hitch pins 30, are provided in a plurality of embodiments, the assembly 10 is provided with at least one pin engaging collar 40. The collar 40 is shown in FIGS. 4 and 6–8 in use with the member 11.

For example, a common embodiment of a hitch pin 30' is shown in phantom in FIG. 4. A head 34' of this pin 30' is created as a round, increased in diameter end portion of the pin 30', with no means thereon capable of being engaged by the stud 18 on the active member 11.

To accommodate removal of such a pin 30', the collar 40 is provided and includes a planar base portion 42 having a bore 44 therein through which a body 46 of the pin 30' may be slid, with the bore 44 having a circumference less than that of the head 34' of the pin 30'.

At one end 47 of the base portion 42 is provided an increased in thickness area 48 which has a channel 50 running therethrough, the channel 50 running along the entire length of the end 47 and being of such diameter as to accept therein the stud 18 on the member 11.

As best shown in FIGS. 6–8, the collar 40 is placed about the pin 30' prior to insertion thereof into interacting bores (shown in phantom) in two structures to be engaged to one another by the pin 30'.

When it is desired to remove the pin 30', the stud 18 on the active member 11 is engaged within the channel 50, with the primary handle 12 of the active member 11 depending downwardly, as shown in FIG. 6. Once engaged, the handle 12 is rotated about the vertex, causing a circumferentially outer surface area portion 52 of the active member 11 to bear against a subjacent surface 60 of one of the structures engaged by the pin 30'. Inasmuch as the arcuate member 14 of the active member 11 has a spiral configuration, with a radius that increases as one moves away from the stud 18, it will be understood that pivoting of the active member 11 about the stud 18 causes an inherent "lift" to be applied against the collar 40 or pin 30 engaged to the stud 18 by interaction between the subjacent surface 60 and surface area portion 52 of the member 11. Alternatively, the collar 40 may be dropped intermittently along the length of the pin 30' and the active member 11 may be operated in such a manner as to provide a "ratchet type" extraction of the pin 30', with the center bore 44 frictionally engaging against the pin at each drop.

Although the collar 40 may be engaged to the stud 18 to extend the planar base portion 42 toward or away from the primary handle 12, it has been found that extending the planar base portion 42 toward the primary handle 12 as shown in FIG. 6 causes a "centering" of the surface 52 of the member 11 under the stud 18, providing improved efficiency.

Returning now to a study of the configuration of the active member 11, it has been found through empirical testing that when the spiral extends less than 350 degrees around, with, as an example for use with a hitch pin 30', the curve being defined to extend from point 0, the vertex formed by the stud 18, as follows:

| DEGREES CLOCKWISE FROM ZERO | LINEAR DISTANCE FROM ZERO |
|---|---|
| 15 | .601 |
| 30 | .871 |
| 45 | 1.469 |
| 60 | 2.468 |
| 75 | 2.969 |
| 90 | 3.421 |
| 105 | 3.819 |
| 120 | 4.229 |
| 135 | 4.598 |
| 150 | 4.942 |
| 165 | 5.244 |
| 180 | 5.600 |
| 195 | 6.001 |
| 210 | 6.393 |
| 225 | 6.837 |
| 240 | 7.241 |
| 255 | 7.664 |
| 270 | 8.161 |

-continued

| DEGREES CLOCKWISE FROM ZERO | LINEAR DISTANCE FROM ZERO |
|---|---|
| 285 | 8.602 |
| 300 | 9.016 |
| 315 | 9.397 |

Obviously, the distance from point 0, the vertex defined by the stud 18, here set forth relates to the size (length) of the hitch pin 30, 30', allowing for enough linear distance along the curve from the vertex 18 to pull the pin 30, 30' completely out of engagement when the member 11 has been completely rotated about the stud 18.

Further, although the assembly 10 has been shown in an embodiment for use with a hitch pin 30, 30', this is not to be construed as limiting, inasmuch as any pin 30, 30' used to join two structures together could be removed with the assembly 10, the assembly 10 being sizable up or down to suit such a purpose.

The primary purpose for the assembly 10 has been described above. However, the assembly 10 also has a secondary related use.

As is known, when objects are being engaged to one another, such as the tongues of the hitches, it is preferable to be able to maintain one tongue 70 elevated to a heights at which the other tongue 72 is positioned.

This is a cumbersome task when one is attempting to perform the engagement alone.

Thus it has been proposed to use the assembly 10 to maintain one tongue 72 elevated as desired.

In this respect, a sleeve 74 is provided which engages over primary handle 12 and can be extended upwardly along the length thereof. The primary handle 12 is provided with a series of throughbores 76 along the length thereof and the sleeve 74 has a corresponding throughbore 78 therein. When the sleeve 74 is set as desired for a tongue 72 heights required, with the active element 11 resting to extend the primary handle 12 vertically upwardly, a pin may be extended through aligned bores 76 and 78 to maintain alignment thereof.

Figure 10:
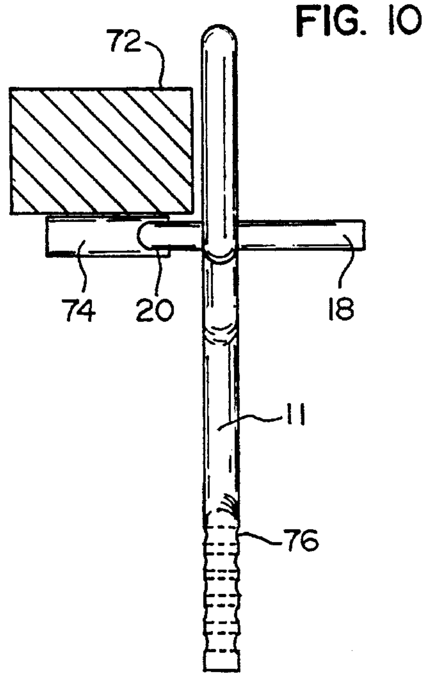
FIG. 10 shows the assembly and sleeve in a modified position elevating the tongue.

If a support for a lower level is desired, the sleeve 74 may be engaged to the secondary handle 20. In this respect a larger cross bore 80 is provided in the sleeve 74 which engages over the secondary handle 20 as shown in FIG. 10. The secondary handle 20 has a bore 82 therein which is mateable with the bore 78 in the sleeve 74, a pin 83 being used to secure this engagement as well. Then, the active member may be positioned to allow the sleeve 74 to create a small ledge upon which a tongue 72 may rest, as shown in FIG. 10.

As described above, the assembly 10 has a number of advantages, some of which have been described above and others of which are inherent in the invention. Also, modifications can be proposed to the assembly 10 without departing from the teachings herein. For example, if desired, the secondary graspable handle 20 could be removable. Also, with an accessory, the assembly 10 could be used to lift something a slight distance off the ground. Accordingly, the scope of the invention is only to be limited as necessitated by the accompanying claims.

I claim:

1. A pin pulling assembly comprising at least one active member having an open planar increasing radius spiral configuration having an inner center end and an outer radial end and having open-pin-head engaging means at the center end thereof and including a pin having a bore in a head portion thereof which engages the open-pin-head engaging means on the active member.

2. The assembly of claim 1 wherein said open-pin-head engaging means comprise a stud set at a right angle to the spiral configuration of the active member.

3. The assembly of claim 2 further including a pin having a bore in a head portion thereof which engages the stud on the active member.

4. The assembly of claim 1 wherein the active member includes at least a primary graspable handle at a radially outer end thereof.

* * * * *